(12) United States Patent
Fieni et al.

(10) Patent No.: US 8,105,397 B2
(45) Date of Patent: Jan. 31, 2012

(54) ALUMINO SILICATE CATALYTIC SYSTEM AND ITS USE

(75) Inventors: Marcello Fieni, Tournai (BE); Francois Collignon, Beauvechain (BE)

(73) Assignee: Marcello Fieni and Andree Leroy (BE)

( * ) Notice: Subject to any disclaimer, the term of this patent is extended or adjusted under 35 U.S.C. 154(b) by 827 days.

(21) Appl. No.: 12/139,048

(22) Filed: Jun. 13, 2008

(65) Prior Publication Data

US 2008/0307697 A1 Dec. 18, 2008

Related U.S. Application Data

(63) Continuation-in-part of application No. PCT/BE2006/000134, filed on Dec. 13, 2006.

(30) Foreign Application Priority Data

Dec. 15, 2005 (EP) .................................. 05447282

(51) Int. Cl.
 *C10L 1/10* (2006.01)
 *C10G 47/00* (2006.01)
(52) U.S. Cl. ....... 44/300; 208/15; 208/111.01; 208/370; 585/240
(58) Field of Classification Search .................... 44/300; 208/111
 See application file for complete search history.

(56) References Cited

U.S. PATENT DOCUMENTS 3,565,788 A * 2/1971 Foucher et al. .......... 208/111.15
3,640,905 A * 2/1972 Wilson, Jr. ...................... 502/67

FOREIGN PATENT DOCUMENTS

| EP | 0 307 239 A2 | 3/1989 |
| EP | 0 395 373 A2 | 10/1990 |

OTHER PUBLICATIONS

Rota Mining: "Natural Zeolite Clinoptilolite" [Online] XP002426581 retrieved from the Internet: URL:<http://www.zeoliteproducer.com/zeolite.html>, 2 pages.

* cited by examiner

*Primary Examiner* — Ellen McAvoy
*Assistant Examiner* — Ming Cheung Po
(74) *Attorney, Agent, or Firm* — Hovey Williams LLP

(57) ABSTRACT

Catalytic process for the transformation of carbon compounds into liquid fuel, in which the reaction is catalysed by an Alumino silicate catalyst comprising counter ion Na and/or K in a sufficient amount so that when mixing 0.2 g of catalyst in powder form with 20 ml water having a pH of 5.56 so as to form a water/catalyst mixture, the pH of the water/catalyst mixture comprised between 4 and 6, said catalytic system further comprising 0.005% to 1% by weight of Ba and/or Sr.

48 Claims, No Drawings

ALUMINO SILICATE CATALYTIC SYSTEM AND ITS USE

This application is a CIP of PCT/BE2006/000134 filed on Dec. 13, 2006 and published on Jun. 21, 2007 under number WO2007/068067, claiming the priority of European Patent Application 05 447 282.4 filed on Dec. 15, 2005, the entire disclosure of which are incorporated herein by reference.

ABSTRACT OF THE DISCLOSURE

The present invention relates to an alumino-silicate catalytic system and its use for the transformation of carbon containing compounds and materials in other carbon containing compounds.

THE PRIOR ART

Alumino silicate catalysts are well known. Such known alumino-silicate catalysts are for example zeolites, synthetic zeolites, pillared clays, clays, etc.

Zeolites are cristalline metalosilicates with framework structures constructed with $SiO_4$ and $MeO_4$ tetrahedre linked through oxygen atoms. Me designates an element of valence 3, which generates a charge necessitating the inclusion of a cation. A great variety of zeolites exists. These zeolites are designed by a letter, acronym or other symbol such as BEA, ZSM-5. IIEU, Y. etc.

For example, the document WO2005/094990 discloses a cracking catalyst containing faujasite (FAU).

The use of zeolite in catalytic chemistry is well known. For example, reference can be made to Chapter 5 of the Book "Catalytic Chemistry", Bruce C. Gates, published in 1992 by John Wiley & Sons.

As said in said document, zeolites have a structure with a Si/Al ratio, the structure with low Si/Al ratios can have higher concentrations of catalytic sites. The acid form zeolites which incorporated $H^+$ as exchangeable ion are hydrophilic, having strong affinities for polar molecules small enough to enter the pores. The zeolites with low $H^+$ concentrations are hydrophobic, taking up organic compounds.

Y-Zeolites are known as being a cracking catalyst of paraffins and petroleum fraction.

The zeolites can be exchanged, such as with rare-earth.

As stated in said book, the zeolite pore geometry can drastically alter the patterns of reactivity.

Zeolite having a low Alpha acidity are known and described for example in U.S. Pat. No. 6,362,123, said patent referring to method for measuring the acidity of a catalyst, It has now been found that specific alumino silicate catalytic systems, especially a specific zeolites, enriched with one or more specific elements, were appropriate for the transformation of carbon containing compounds, such as for the cracking thereof, for the hydrogenation of carbon containing compounds, hydrocracking, etc., said catalyst ensuring a good conversion with a good selectivity in the desired compounds, such as liquid hydrocarbons with 3 to 22 carbon atoms.

BRIEF DESCRIPTION OF THE INVENTION

The invention relates to an alumino-silicate catalytic system, advantageously a zeolite catalytic system, suitable for the transformation of carbon containing compounds and materials, advantageously a transformation following at least partly a radical reaction. The alumino-silicate catalyst system comprises at least one counter ion selected from the group Na, K, Ca and mixtures thereof in an amount sufficient to render said catalytic system as not being acid or as having a low or limited acidity. Advantageously, said counter ion(s) is (are) present in a sufficient amount so that a water/alumino-silicate catalytic system mixture prepared by mixing 0.2 g of catalyst in powder form with 20 ml water having a pH of 5.56 and a temperature of 20° C., has a pH (measured at 20° C.) higher than 4, but advantageously lower than 6, advantageously comprised between 4.2 and 6, preferably greater than 4.5, most preferably comprised between 4.5 and 5.5, especially between 4.6 and 5.2. The mixing step of the alumino-silicate catalytic system with water is a vigorous stirring without formation of gas or air bubbles which can interfere with the pH electrode.

The catalytic system of the invention is advantageously a catalytic system suitable to control radical reaction of carbon containing compounds, advantageously carbon containing polymer and copolymer, rubber, hydrocarbons, etc., said reaction occurring possibly in presence of trace of oxygen.

The catalyst system of the invention has advantageously an alpha acidity of less than 1, preferably less than 0.5, most preferably less than 0.3, especially less than 0.2. more specifically between 0.001 and 0.2, such as comprised between 0.05 and 0.15. The Alpha acidity or value is an approximate indication of the catalytic cracking activity of the catalyst compared to a standard catalyst and it gives the relative rate constant (rate of normal hexane conversion per volume of catalyst per unit of time). It is based on the activity of the highly active silica-alumina cracking catalyst which has an Alpha value of 1 (rate constant of 0.016 $sec^{-1}$). The test of alpha acidity is described in U.S. Pat. No. 3,354,078, in the Journal of catalysis, 4,527 (1965); 6, 278 (1966); 61, 395 (1980). The experimental conditions of the test used therein include a constant temperature of 538° C. and a variable flow rate as described in the Journal of catalysis, 61, 395 (1980).

The catalyst system has a BET surface (measured by the method disclosed in Brunauer S., Emmett P H., Teller E., J. Am. Chem. Soc., (1938) 60, 39) comprised between 5 and 60 $m^2/g$ and a surface formed by mesopores with a diameter comprised between 2 nm and 50 nm comprised between 5 and 50 $m^2/g$. Advantageously, the catalyst system has a total pore volume (at $P/P_0$=0.98) comprised between 0.01 and 0.2 $cm^3/g$ (preferably between 0.05 and 0.15 $cm^3/g$, most preferably between 0.08 and 0.14 $cm^3/g$) and a volume formed by mesopores with a diameter comprised between 2 nm and 50 nm from 0.05 $cm^3/g$ and 0.15 $cm^3/g$. Advantageously, a major portion of the mesopore volume is filmed by mesopores with a diameter comprised between 20 nm and 40 nm. For example, at least 50% of the mesopore volume (formed by mesopores with a diameter comprised between 2 nm and 50 nm), preferably at least 60%, most preferably from 65% to 90% is formed by mesopores with a diameter comprised between 20 nm and 40 nm.

According to a preferred embodiment, the alumino-silicate catalytic system has an open inner volume formed by mesopores with a diameter comprised between 2 nm and 50 nm, whereby at least 50% of the open inner volume formed by mesopores with a diameter comprised between 2 nm and 50 nm is formed by mesopores with a diameter comprised between 20 nm and 40 nm, while advantageously less than 40% of the open inner volume formed by mesopores with a diameter comprised between 2 nm and 50 nm is formed by mesopores with a diameter not comprised between 20 nm and 40 nm.

The catalytic system further comprises from 0.0005% to 1% by weight of at least one element selected from the group consisting of Ba, Sr and mixtures thereof with respect to the dry weight of the catalytic system. Preferably, the catalytic system comprises Ba and Sr, the weight ratio Ba/Sr being advantageously comprised between 1:10 and 10:1, preferably between 1:5 and 5:1.

According to an embodiment, the alumino silicate catalytic system has a surface formed by mesopores with a size comprised between 2 nm and 50 nm comprised between 10 and 40 $m^2/g$, advantageously between 20 and 40 $m^2/g$, preferably between 25 and 35 $m^2/g$.

According to an advantageous detail, the alumino silicate catalytic system has a Si/Al atomic ratio comprised between 4 and 10, advantageously between 4.5 and 8, preferably between 4.8 and 6.

According to a specific embodiment of the alumino silicate catalytic system, at least 35% of the BET surface is generated by the outer surface area formed by mesopores with a size comprised between 2 nm and 50 nm. Advantageously at least 45%, more advantageously at least 50%, preferably at least 60%, most preferably at least 70% of the BET surface is formed by the surface formed by mesopores with a size comprised between 2 nm and 50 nm; In said embodiment, advantageously less than 55%, more advantageously less than 40%, preferably less than 30% of the BET surface is formed by surfaces other than surface formed by mesopores with a size comprised between 2 nm and 50 nm.

According to a detail of an embodiment, the alumino silicate catalytic system comprises at least 1% by weight, advantageously from 2 to 10% by weight, preferably from 3 to 8% by weight of at least one counter ion selected from the group Na, K, Ca and mixtures thereof with respect to the dry weight of the alumino-silicate catalytic system.

The alumino silicate catalytic system which comprises at least Ca and K as counter ions, has advantageously a weight ratio Ca/K expressed in their oxide form CaO/$K_2O$ comprised between 0.5 and 3, more advantageously between 1 and 2, preferably between 1.2 and 1.8.

The alumino silicate catalytic system of the invention comprises advantageously at least 50 ppm, in particular at least 250 ppm, preferably at least 500 ppm, most preferably at least 750 ppm of at least one atom or element selected from the group consisting of Ba, Sr and mixtures thereof. Advantageously, the alumino silicate catalytic system comprises less than 2% by weight, more advantageously less than 1% by weight, preferably less than 0.5% by weight of atoms selected from the group consisting of Ba, Sr and mixtures thereof.

The alumino silicate catalytic system comprises thus advantageously from 500 ppm to 5000 ppm of atoms selected from the group consisting of Ba, Sr and mixtures thereof.

According to a preferred embodiment, the alumino silicate catalytic system further comprises at least 10 ppm, advantageously less than 1000 ppm (for example thus from 10 ppm up to 1000 ppm, advantageously from 20 ppm to 500 ppm) of element selected from the group consisting of Mn, Cr, Fe, Zn, Ti and mixtures thereof.

According to an embodiment, the alumino silicate catalytic system has an average particle size of less than 1 mm, advantageously less than 500 µm, preferably less than 250 µm.

Advantageously, the alumino-silicate catalytic system has a form selected from the group consisting of elementary alumino-silicate catalytic particles, agglomerated product comprising elementary alumino-silicate catalytic particles, support provided with a coating comprising elementary alumino-silicate catalytic particles, and combinations thereof, whereby the elementary alumino-silicate catalytic particles have an average particle size of less than 1 mm, preferably less than 250 µm, most preferably comprised between 10 µm and 100 µm.

The alumino silicate catalytic system has advantageously a structural water content of less than 20% by weight.

When the catalytic system is used, the catalytic system is advantageously substantially exempt of free water, preferably in a hydrated form or a partially hydrated form.

In the process of the invention, the reactive material added to the carbon containing materials or waste materials to be treated is advantageously a solid carbon containing material having a carbon content higher than 65% by weight, preferably higher than 80% by weight, said reactive material having advantageously a hydrogen content directly bound to carbon atom of less than 5% by weight, most preferably less than 2% by weight. Said reactive material is advantageously in the form of powder or particles with an average weight size of less than 1 mm, preferably less than 500 µm, most preferably comprised between 10 µm and 400 µm. The weight ratio solid carbon containing material with a C content of more than 65% by weight/alumino silicate catalytic system is advantageously comprised between 0.5 and 100, preferably between 1 and 10, most preferably between 1.5 and 5.

The invention relates also to a catalytic mixture comprising a solid carbon containing support or material and an alumino silicate catalytic system of the invention with one or more characteristics as disclosed hereabove. According to an embodiment of said catalytic mixture, the solid carbon containing support or material has a carbon content higher than 65% by weight, advantageously higher than 80% by weight, preferably higher than 90% by weight. Advantageously, the solid carbon containing support or material has a hydrogen content directly bound to a carbon atom of less than 10% by weight, preferably less than 5%, most preferably less than 2%.

According to a detail of said mixture, the weight ratio solid carbon containing support or material/alumino silicate catalytic system is comprised between 0.5 and 100, advantageously between 1 and 10, preferably between 1.5 and 5.

In the process of the invention, the carbon containing material is reacted in presence of a catalytic mixture comprising:
(a) an alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 $m^2/g$, and
a surface formed by mesopores with a size comprised between 2 nm and 50 nm, comprised between 5 and 50 $m^2/g$,
said alumino-silicate catalytic system further comprising 0.005% to 1% by weight of at least one element selected from the group consisting of Ba, Sr and mixtures thereof with respect to the dry weight of the catalytic system, and
(b) a zeolite different from the alumino-silicate catalytic system (a),
whereby the weight ratio alumino-silicate catalytic system (a)/zeolite (b) is comprised between 1:20 and 20:1, preferably between 1:10 and 10:1. The invention relates thus also to such a catalytic mixture, in which the alumino-silicate catalytic system (a) has advantageously one or more characteristics as disclosed in the present specification for the transformation of carbon containing compounds, especially as disclosed in the process claims.

According to another preferred embodiment, the carbon containing material is reacted in presence of a catalytic mixture comprising:
(a) an alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has
a BET surface comprised between 5 and 60 $m^2/g$, and
a surface formed by mesopores with a size comprised between 2 nm and 50 nm, comprised between 5 and 50 $m^2/g$,
said alumino-silicate catalytic system further comprising 0.005% to 1% by weight of at least one element selected from the group consisting of Ba, Sr and mixtures thereof with respect to the dry weight of the catalytic system, and
(b) an acid zeolite different from the alumino-silicate catalytic system (a),
whereby the weight ratio alumino-silicate catalytic system (a)/acid zeolite (b) is comprised between 1:10 and 10:1, The invention relates thus also to such a catalytic mixture. in which the alumino-silicate catalytic system (a) has advantageously one or more characteristics as disclosed in the present specification for the transformation of carbon containing compounds, especially as disclosed in the process claims.

According to still another preferred embodiment, the carbon containing material is reacted in presence of a catalytic mixture comprising:
(a) a first alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 $m^2/g$,
a surface formed by mesopores with a size comprised between 2 nm and 50 nm, comprised between 5 and 50 $m^2/g$, and
an alpha acidity comprised between 0.3 and 1,
said first alumino-silicate catalytic system further comprising 0.005% to 1% by weight of at least one element selected from the group consisting of Ba, Sr and mixtures thereof with respect to the dry weight of the catalytic system, and
(b) a second alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH or 5.56 and a temperature of 20° C., has a pH measured at 20° C. comprised between 4 and 6,
whereby the alumino-silicate catalytic system has:
a BET surface comprised between 5 and 60 $m^2/g$,
a surface formed by mesopores with a size comprised between 2 nm and 50 nm, comprised between 5 and 50 $m^2/g$, and
an alpha acidity of less than 0.3,
said second alumino-silicate catalytic system further comprising 0.005% to 1% by weight of at least one element selected from the group consisting of Ba, Sr and mixtures thereof with respect to the dry weight of the catalytic system,
whereby the weight ratio first alumino-silicate catalytic system (a)/second alumino-silicate catalytic system (b) zeolite (b) is comprised between 1:50 and 20:1, advantageously between 1:25 and 10:1, preferably between 1:15 and 5:1. most preferably between 1:2 and 4:1.

The invention relates thus also to such a catalytic mixture, in which the alumino-silicate catalytic system (a) and/or (b) has advantageously one or more characteristics as disclosed in the present specification for the transformation of carbon containing compounds, especially as disclosed in the process claims.

The invention further relates to a catalytic mixture comprising an acid catalytic zeolite (such as a zeolite having a pH of less than 4 when mixing 0.2 g of catalyst in powder form with 20 ml water having a pH of 5.56 or a zeolite having an alpha acidity or value greater than or equal to 1) and an alumino silicate catalytic system of the invention as disclosed here above. The acid catalytic zeolite is for example a zeolite having an acidity greater than the alumino silicate system present in the mixture. According to a possible embodiment: the mixture comprises two distinct alumino silicate systems of the invention having different pH when mixing 0.2 g of catalyst in powder form with 20 ml water having a pH of 5.56.

Advantageously, the weight ratio acid catalytic zeolite (such as with an alpha acidity greater or equal to 1)/alumino silicate catalytic system of the invention is comprised between 1:20 and 20:1, preferably between 1:10 and 10:1.

Another object of the invention is a catalytic mixture comprising at least two distinct alumino silicate catalytic systems of the invention. For example, a first alumino silicate system has an alpha acidity comprised between 0.3 and 1, while a second alumino silicate system has an alpha acidity of less than 0.3.

According to an advantageous embodiment, the weight ratio first alumino silicate system with an alpha acidity comprised between 0.3 and 1/second alumino silicate system with an alpha acidity of less than 0.3 is comprised between 1:50 and 20:1, advantageously between 1:25 and 10:1, preferably between 1:20 and 1:1.

The invention still relates to a catalytic support comprising an inert support coated with an alumino silicate catalytic system of the invention and/or a catalytic mixture of the invention.

The invention relates especially to a process for the transformation of carbon containing compounds, in which the carbon containing material is reacted, advantageously in presence of at least one reactive material, in presence of a catalytic system of the invention, or a catalytic mixture of the invention.

Advantageously, the process is a process, in which a polymer and/or plastic waste, advantageously mixed with a carbon containing material having a carbon content higher than 80%, preferably higher than 90%, is converted at least partly into a liquid fuel. Preferably in said process, the weight ratio polymer and/or plastic waste/carbon containing material is comprised between 1:10 and 10:1, advantageously between 2:10 and 10:2, preferably between 10:1.1 and 10:4, most preferably between 10:1.1 and 10:2.5. A very appropriate ratio is about 10:1.5 to 10:1.2.

According to detail of embodiments, the polymer and/or plastic waste is treated at a temperature comprised between 100° C. and 750° C., advantageously between 200° C. and 600° C., preferably between 250° C. and 500° C., and under a pressure comprised between 0.1 10⁵ Pa and 50 10⁵ Pa, advantageously between 1 10⁵ Pa and 20 10⁵ Pa.

The process of the invention is preferably a process, in which a carbon containing material is at partly submitted to a cracking.

DESCRIPTION OF PREFERRED EMBODIMENTS

Catalyst n°1 (CP1)

Natural Clinoptilolite sold by Rotamining (sample from Kalabak Damlari district, Gordes, Manisa, Turkey) was used in the preferred embodiments.

Said natural clinoptilolite had the following characteristics:

Chemical characteristics:
Si/Al atomic ratio of about 5.11
Si content expressed in $SiO_2$: 71 weight % with respect to the burned product (water free)
K content expressed in $K_2O$ of about 2.4 weight % with respect to the burned product (water free)
Ca content expressed in CaO of about 3.4 weight % with respect to the burned product (water free)
Mg content expressed in MgO of about 1.4 weight % with respect to the burned product (water free)
Na content expressed in $Na_2O$ of about 0.4 weight % with respect to the burned product (water free)
Ti content expressed in $TiO_2$ of about 0.1 weight % with respect to the burned product (water free)
Sr content of about 700 ppm with respect to the burned product (water free)
Ba content 450 ppm with respect to the burled product (water free)
mix of various metals: about 300 to 1000 ppm with respect to the burned product (water free)

Said mix of metals comprises essentially about 150-180 ppm Mn, about 70 to 100 ppm Fe, about 40 to 60 ppm Zn and about 5 to 20 ppm Cr. Other metals which are present are less than 5 ppm Mo, less than 10 ppm Ni, less than 10 ppm Cu, less than 10 ppm Co, less than 50 ppm As, less than 5 ppm Cd, less than 50 ppm Pb, less than 50 ppm Se.

The catalyst is a zeolite of the clinoptilolite family, which was exempt of quartz, mica. The zeolite comprises minor amount of feldspar and smectite and is K and Ca rich.

Physical characteristics:
a low acid or quite neutral character (when introducing 0.2 g of the catalyst powder in water having a pH of 5.56 and a temperature of 20° C., the pH of the solution was 5.64 without stirring and 4.46 under vigorous agitation without air bubbles formation).
a low alpha acidity (less than 0.3)
a BET surface of 40.3 m²/g (measured by the method disclosed in Brunauer S., Emmett P H., Teller E., J. Am. Chem. Soc., (1938) 60, 39)
large mesopores having a diameter comprised between 10 nm and 50 nm generating a volume of 0.078 cm³/g (volume of mesopores with a diameter comprised between 2 nm and 50 nm=about 0.094 cm³/g, volume of mesopores with a diameter comprised between 20 nm and 40 nm=0.065 cm³/g)
a surface $S_{ext}$ defined by external mesopores having a diameter comprised between 2 nm and 50 nm of about 28 m²/g, said surface being determined by nitrogen sorptions measurements and decomposing the adsorption branches of the isotherms with the BJH or the t-plot treatment. Said methods are disclosed in W. D. Hurkins, G. Jura, J. Am. Chem. Soc. 66 (1944), 1366 and E. P. Barret, L. G. Joyner and P. H. Hallender, J. Am. Chem. Soc 71 (1951).373.

a micropore volume of about 0.005 cm³/g (volume of pores with a diameter of less than 2 nm—determined by t-plot)
a total pore volume of about 0.101 cm³/g
particle size (average in weight) of about 500 μm
an average weight zeolite crystallite diameter of about 140 nm, said diameter being estimated by assuming a framework density (FDz) of 17 tetrahedres per nm³ and by the following formula $$d = 6 \cdot 10^{-18} \, Na \, (FDz \, 60 \, S_{ext})^{-1}$$

in which $S_{ext}$ is expressed in m²/g and is the mesoporous surface area generated by the outer surface of the zeolite cristallite.

Na is the Avogadro number

Said formula is disclosed in Collignon et al, Journal of Physical Chem. B (2001), 105(29), 6812 to 6816.

Other catalysts CP

Other catalysts can be prepared From various zeolite (for example from USY zeolite, Y zeolite, A zeolite, etc.) cation exchange, Such a cation exchange can be operated by mixing zeolite particles with a liquid medium in which Ba and/or Sr are soluble. Advantageously, the liquid is alcohol or an aqueous medium, such as water, water with one or more tensioactive, a mixture of water and alcohol(s), in which nitrate, chlorine or acetate salts of Sr and/or Ba are dissolved. The preferred salts are the nitrate and the acetate. The most preferred salt is the acetate. The cation exchange is for example operated at a temperature comprised between 10° C. and the boiling point of the medium, advantageously between 20° C. and 60° C. The medium comprises advantageously other salts, such Na salts and Ca salts, especially in the acetate form.

After the cation exchange is carried out, the zeolite can be removed from the medium, for example by filtration, and dried. Possibly, the medium containing the zeolite can directly be submitted to a drying. The drying step can be made under vacuum and/or by heating at temperature sufficient for evaporating the solvent (water, alcohol), for example at a temperature of about 130° C. for several hours.

After the drying operation of the zeolite, the zeolite is submitted to a calcination step, advantageously at a temperature from 300° C. to 800° C. for several hours, such as at temperature comprised between 350° C. and 550° C.

The cation exchange step can be operated in several successive steps, for example for controlling the successive exchange of different cations.

The zeolite can be further submitted to a cation exchange for exchanging cation different from Ba and Sr.

The Zeolite, before being submitted to a cation, exchange, can be pretreated, for example can be washed or treated with water and/or alcohol vapor. For example, the zeolite can be subjected to a dealumination step, for example a steaming dealuminization process (contacting the zeolite with steam at high temperature, such temperature from 350° C. and 815° C.) so as to form hydroxyl nests.

Possibly, after cation exchange, the catalyst is substantially neutral, meaning that when mixing 0.2 g of zeolite in 20 ml water having a pH of 5.56 at 20° C., the pH of the aqueous medium is higher than 5 (from 5 to 6).

By using this process, it is possible to prepare Ba and Sr containing zeolite having an alpha acidity comprised between 0.3 and 1, and an acidity of less than 4 (pH of less than 4 when measuring the pH of 0.2 g of catalyst in 20 ml water at 20° C. having a pH of 5.56, said measurement being made under vigorous stirring without formation of air bubbles).

Shape/form of the catalysts CP

The catalyst can have various forms, such as the form of a powder, such as powder having an weight average particle size comprised between 10 μm and 1000 μm, such as between 50 μm and 500 μm, the form of a support (such as an inert support, an acid alumino silicate support, a carbon containing support (for example carbon black, coal, tar, etc.)) provided with a coating comprising catalyst powder of the invention or a coating layer comprising catalyst powder of the invention.

The catalyst can also be shaped in the form of pellets, granules, extrudates, coated supports, etc.

The catalyst can be used as coating one or more surfaces of the reactor.

Catalyst mixtures CM

Catalyst mixtures CM1 to CM9

Anthracite was crushed so as to obtain particles with a weight average size of about 1 mm.

Said particles were sieved so as to collect three distinct fractions, namely the fraction A comprising essentially particles with a size larger than 1 mm (sieve n° 18), a second fraction β comprising particles with a size comprised essentially between 500 μm and 1 mm (sieve n° 35), and a third fraction comprising particles with a size essentially lower than 500 μm. Said fractions have been used for preparing various catalyst mixtures by mixing anthracite particles with basic catalyst particle n° 1. The following table gives details of prepared catalyst fractions.

| Catalyst mixture | Used anthracite fraction | Weight ratio CP1/anthracite particle |
|---|---|---|
| CM1 | A | 1:5 |
| CM2 | A | 1:3 |
| CM3 | A | 1:1 |
| CM4 | B | 1:6 |
| CM5 | B | 1:4 |
| CM6 | B | 1:2 |
| CM7 | C | 1:8 |
| CM8 | C | 1:4 |
| CM9 | C | 1:2 |

Catalyst mixtures CM10 to CM18

The catalyst particles CP1 was mixed with other zeolites Z with different acidity, said zeolites being in the form of particles with a size of about 500 μm. The following table gives details of the prepared catalyst mixtures.

| Catalyst mixture | Added zeolite Z | Acidity expressed in pH* | Weight ratio CP1/Z |
|---|---|---|---|
| CM10 | Zeolite Y | 4.2 | 10:1 |
| CM11 | Zeolite Y | 4.2 | 5:1 |
| CM12 | Zeolite Y | 4.2 | 5:2 |
| CM13 | Zeolite Beta | 2.98 | 20:1 |
| CM14 | Zeolite Beta | 2.98 | 10:1 |
| CM15 | Zeolite Beta | 2.98 | 5:1 |
| CM16 | Zeolite ZSM-5 | 2.99 | 50:1 |
| CM17 | Zeoiite ZSM-5 | 2.99 | 25:1 |
| CM18 | Zeolite ZSM-5 | 2.99 | 15:1 |

(*pH measured after adding 0.2 g of catalyst in 20 ml water having a pH of 5.56, the measure is carried out at 20° C. and under vigourous stirring without formation of air bubbles in the medium)

EXAMPLES OF PROCESS

Example 1

To a 500 ml flask (heat insulated) with a single neck, 21.66 anthracite powder 102.44 g HDPE (Finathene, pellets form) and 7.5 g of Zeolite CP1 was added.

This flask was heated with a "200 watts electromantel" with 50% of its power supply rating. No agitation was performed. The system was hermetically closed, but vapours were allowed to condense, while gas was collected in a 40 liters empty tedlar bag.

Vapours appear 15-30 minutes after the heating operation. Temperatures measured between the wall of the flask and the heating zone were about 480° C. for the hotter point and 300 to 370° C. for the colder point. Temperature of the distillation point where vapours are allowed to condense reaches a maximum temperature of 220° C. during the reaction.

The mixture was reacted for 4 hour 30 minutes. The HDPE was converted into a mix of olefins in C3 to C23, from propene to tricosane. Substantially no gases were formed. A very small amount of methane was detected in the gases, showing that the transformation followed at least partly a radical reaction.

The yield of conversion into liquid compound (liquid at 20° C. and at $10^5$ Pa) was 87.6% by weight with respect to the weight of HDPE. The liquid mixture had a density of about 0.748 g/cm$^3$. Substantially no wax or heavy oil remained in the flask. The liquid had substantially no color.

This process was thus suitable for having a partial conversion of HDPE into liquid compounds, with substantially no losses due to gas formation or wax formation.

Such a process is thus particularly suitable for converting plastic waste into a liquid fuel, especially in a diesel fuel suitable for diesel car, trucks, buses, etc.

Example 2

Example 1 was repeated except that the reaction time was 6 hours and 15 minutes. The HDPE was converted into a mix of olelins in C3 to C23, from propene to tricosane.

The total weight conversion yield based on the weight of HDPE was about 89.4%.

The yield of conversion into liquid compounds (liquid at 20° C. and at $10^5$ Pa) vvas 84.2% by weight with respect to the weight of HDPE. The liquid mixture had a density of about 0.745 g/cm$^3$.

Some wax were formed in the flask, said wax corresponding to about 10.6% by weight of the weight of HDPE.

A very small amount of methane was detected in the gases, showing that the transformation followed at least partly a radical reaction.

Example 3

Example 1 was repeated except that the reaction time was 4 hours and 45 minutes. The HDPE was converted into a mix of olefins in C3 to C22, from propene to docosane.

The total weight conversion yield based on the weight of HDPE was about 97.0%.

The yield of conversion into liquid compounds (liquid at 20° C. and at $10^5$ Pa) was 89.8% by weight with respect to the weight of HDPE. The liquid mixture had a density of about 0.741 g/cm$^3$.

Some wax were formed in the flask, said wax corresponding to about 3.0% by weight of the weight of HDPE.

A very small amount of methane was detected in the gases, showing that the transformation followed at least partly a radical reaction.

It appears from said examples, that the catalyst of the invention is suitable for achieving a high conversion of polymer, said conversion being highly selective in liquid fuel (selectivity of more than 90% by weight, such as more than 95% and even more) and without formation of large amount of waxes and gas losses.

Example 4

Example 1 was repeated except that the reaction time was 4 hours and 20 minutes and that no anthracite powder was used.

The total weight conversion yield based on the weight of HDPE was about 78%.

The yield of conversion into liquid compounds (liquid at 20° C. and at $10^5$ Pa) was 74% by weight with respect to the weight of HDPE. The liquid mixture had a density of about 0.743 g/cm$^3$.

Some wax were formed in the flask, said wax corresponding to about 21.3% by weight of the weight of HDPE.

The catalyst had a good selectivity, but the presence of anthracite was suitable for improving the conversion, while maintaining the selectivity.

The combination catalyst+anthracite was suitable for avoiding or reducing the formation of waxes.

In the examples 1 to 4, the reaction was carried out advantageously in presence of nitrogen and in the absence of oxygen (from the air). For further improving the yield, it was advantageous to admit into the reactor an inert carrier gas, such as nitrogen, so as to improve the removal of the olefins formed from the reactor flask and so as to direct said olefins into the condenser. In such a case, the condenser has to be provided with a system for recovering the carrier gas (nitrogen), system which can used for possibly recycling the recovered carrier gas (nitrogen) into the reactor.

Comparative Examples

Example 5R

Example 1 was repeated except that the reaction time was 4 hours and 45 minutes and that no anthracite powder and no catalyst were used.

The total weight conversion yield based on the weight of HDPE was about 62.5%.

The yield of conversion into liquid compounds (liquid at 20° C. and at $10^5$ Pa) was 58% by weight with respect to the weight of HDPE. The liquid mixture had a density of about 0.757 g/cm$^3$.

Some waxes were formed in the flask, said wax corresponding to about 37.1% by weight of the weight of HDPE.

Example 6R

Example 1 was repeated except that the reaction time was 5 hours and 45 minutes and that no catalyst was used.

The total weight conversion yield based on the weight of HDPE was about 44.4%.

The yield of conversion into liquid compounds (liquid at 20° C. and at $10^5$ Pa) was 40% by weight with respect to the weight of HDPE. The liquid mixture had a density of about 0.748 g/cm$^3$.

Some waxes were formed in the flask, said wax corresponding to about 55.6% by weight of the weight of HDPE.

Example 7R

Example 1 was repeated except that another natural clinoptilonite catalyst was used and that the reaction was carried out for 4 hours. Said other catalyst had a outer surface area $S_{ext}$ of about 16 m$^2$/g, an acidity of about 4.8 (pH test in water having a pH of 5.56 with stirring). Said catalyst did not contain Ba and Sr.

The total weight conversion yield based on the weight of HDPE was about 83.0%.

The yield of conversion into liquid compounds (liquid at 20° C. and at $10^5$ Pa) was 77% by weight with respect to the weight of HDPE.

Some waxes were formed in the flask, said wax corresponding to about 17% by weight of the weight of HDPE.

Example 8R

Example 1 was repeated except that an acid zeolite (Beta zeolite from Zeolyst) catalyst was used and that the reaction was carried out for 3 hours. Said other catalyst had a Si/Al atomic ratio of about 13.2 an outer surface $S_{ext}$ of about 250 m$^2$/g, an acidity of about 3 (pH test in water having a pH of 5.56 with stirring).

The total weight conversion yield based on the weight of HDPE was about 97.9%.

The yield of conversion into liquid compounds (liquid at 20° C. and at $10^5$ Pa) was 61% by weight with respect to the weight of HDPE.

Some wax were formed in the flask, said wax corresponding to about 2% by weight of the weight of HDPE.

Example 9R

Example 1 was repeated except that a zeolite Y (LY-82 from Union Carbide) catalyst was used and that the reaction was carried out for 3 hours 45 minutes. Said other catalyst had a Si/Al atomic ratio of 2.5, an outer surface $S_{ext}$ of about 57 m$^2$/g, an acidity of about 4.2 (pH test in water having a pH of 5.56 with stirring).

The total weight conversion yield based on the weight of HDPE was about 93.9%.

The yield of conversion into liquid compounds (liquid at 20° C. and at $10^5$ Pa) was 82% by weight with respect to the weight of HDPE.

Some waxes were formed in the flask, said wax corresponding to about 6.1% by weight of the weight of HDPE.

Example 10R

Example 1 was repeated except that an acid zeolite ZSM-5 (from PQ-CBV 5020) catalyst was used and that the reaction was carried out for 3 hours. Said other catalyst had a Si/Al atomic ratio of about 25 an outer surface $S_{ext}$ of about 84 m$^2$/g, an acidity of about 3 (pH test in water having a pH of 5.56 with stirring).

The total weight conversion yield based on the weight of HDPE was about 99.9%.

The yield of conversion into liquid compounds (liquid at 20° C. and at $10^5$ Pa) was 47.3% by weight with respect to the weight of HDPE.

Example 11R

Example 1 was repeated, with and without stirring, except that Ca(OH)2 with a surface area of about 50 m$^2$/g was used instead of the catalyst of the invention. After about 6 hours reaction, the conversion yield in liquids (liquid at 20° C. and at $10^5$ Pa) was about 45% by weight (with respect to the initial weight of HDPE).

Example 12R

A nateural heulandite was treated with HCl as mineral acid. The treatment was carried out by using HCl, 2 M as taught in EP307239. When mixing 0.2 g of said treated heulandite in 20 ml water, the pH of the aqueous mixture was about 3.

Example 1 was repeated with said treated heulandite. The formation of waxes in the reactor was observed. The liquid collected in the condenser was not transparent, nor translucide, and had a dark color. The selectivity in liquid fuel for the reaction was lower than 85%.

Example 13R

A nateural Heulandite was treated with a strong base (NaOH 2M). When mixing 0.2 g of said treated heulandite in 20 ml water, the pH of the aqueous mixture was about 9.5-10.

Example 1 was repeated with said treated heulandite. The formation of waxes in the reactor was observed. The liquid collected in the condenser had a strong yellow color. A high amount of gas was formed. The selectivity in liquid fuel for the reaction was lower than 85%, Other examples of process using the catalyst of the invention Example 14

Example 3 was repeated with only 14 g anthracite in powder form. After a reaction time of 5 hours 50 minutes, the weight conversion rate was 95.4% with respect to the polyolefin weight. The weight liquid yield is about 88.2%.

Example 15

Said example has been carried out so as to show that the catalyst of the invention is stable and can be reused.

100.33 g of HDPE was added to the flask containing the solid residue of example 2. The mixture was heated as done in example 2. After 6 hours, the total conversion was about 85% while the liquid yield was about 80%.

Example 16

Example 1 has been repeated, by using the used catalyst of example 1 after a regeneration step, such as a water vapour regeneration step and/or a calcination step, so as to remove part of coke or waxy compounds present in the catalyst or coating the catalyst.

Example 17

Example 1 has been repeated, except that anthracite powder and catalyst powder CP1 were dry premixed before adding the catalytic support to the reactor. The conversion rate was still improved with an increased selectivity in liquids.

Example 18

Example 1 was repeated, except that 1 hour after the start of the reaction, the reaction flask was stirred (mechanical agitation at 50 rpm). After 2 hours 30 minutes, the yield of conversion into liquid compounds (liquid at 20° C. and $10^5$ Pa) was 92% by weight with respect to the weight of HDPE.

It appears thus that the stirring was beneficial for increasing the reaction speed, as well as the yield in liquids. Agitation enhanced the thermal transfer and prevent carboneous deposit on the wall of the reacting flask. Oils formed during the reaction plays as lubricant.

By repeating examples 2 to 4 with stirring, it was observed that the reaction yield in liquid was increased and that the reaction speed was also improved. Best results were obtained by mixing the carbon containing compound to be converted from the start of the reaction.

Example 19

Example 1 was repeated except that a bituminous coal was used instead of HDPE, and that the reaction flask was stirred. The bituminous coal had a H/C molar ratio of about 0.8 After about 6 hour reaction, a yield of about 88% was achieved in liquid hydrocarbons.

Example 20

Example 1 was repeated, except that an industrial waste was used instead of HDPE. The industrial waste comprised about 78.1% PP and about 17.2% PE. The remaining part of the waste was wood, PUR, rubber, etc.

After 3 hours reaction (stirred), the conversion yield in liquids (at 20° C. and at $10^5$ Pa) was about 92% with respect to the weight of waste material. The average density of the so obtained liquids was about 0.747.

The solid residue remaining in the reaction flask was substantially dry and not waxy (no wax appearance).

The solid residue of the reacting flask was milled in a finely divided powder, before being re-used as catalyst and co-catalyst for converting a new charge of industrial waste. After 3 hours reaction (with stirring), a conversion yield of about 85% was achieved. The catalyst was thus still quite active, even without specific regeneration step.

Further Examples

Various other examples have been carried out for converting various carbon containing material into liquids, very similar to diesel, petrol, gasoline, white spirit, etc. and mixtures thereof. The so produced liquids (after a reaction time of about 3 to about 5 hours and reaction temperature from 300° C. to 500° C.) had an average density from about 0.74 to about 0.85. Chromatographic analyses have shown that the liquids was formed by hydrocarbons with from 4 to 24 carbon atoms.

Some gases were formed during the conversion reaction, said gases comprising some methane.

Tests made on the floating part of solid plastic waste material (plastic material having a density of less than 1), after its drying, have shown a conversion yield of more than about 90%, even after re-using the solid residue as catalytic charge for a new charge.

Tests made on a mix of oil residue (from cars, as well from vegetal oils and mixes thereof, such as palm oils, soy oils, corn oil, coconut oils, etc.) and wood have shown the production of a hydrocarbon liquid fraction and a solid fraction (in the reaction flask) similar to charcoal. Said charcoal was suitable for barbecue. The invention relates also thus to the catalytic conversion of wood into charcoal.

Rubber tyres have been treated in presence of the catalyst of the invention. A liquid fraction was recovered (yield of between 30 and 40% of the initial weight of the tyre), while a solid substantially dry fraction was remaining in the reaction flask, said solid fraction comprising various solid additives present in the tyres, such as filler, metallic wires, carbon black particles. Said solid fraction was in a form which could be easily broken in powder, except for the metallic parts.

Bituminous layers (used for covering roofs, street, highways, etc.) was treated with the catalyst as in example 1. The bituminous layers were converted in liquids (yellow, transparent, homogeneous, untroubled appearance) with a yield of more than about 70% after about 2 hours time.

A further test was carried in a semi industrial plant or pilot plant. To a 5 liters pilot reactor, 30 g anthracite, 50 g limestone ($CaCO_3$) in powder, 1 kg of ultimate waste (for example from shredded car residues) and 80 g of the catalyst used in example 1 were added. The reactor was progressively heated with a "electromantel" with 50% of its power supply rating. The ultimate waste contains small piece of wood, clays, sand, some piece of metals, and large amount of PUR foams. Temperature measured in the flask was 350-419° C. maximum and temperature of distillated vapours were lower than 200° C. The vapours were collected in a condenser. The pilot plant was a closed system, with vapours condensed in the condenser. Note that vapours having distillation temperatures between 120 and 170° C. were transparent. Non-condensables gas were collected and burned.

After 2 h, the process was stopped. At said moment, the residual solid was surprisingly a mixture of metallic pieces and carbon black like product/powder.

As it can be seen, the catalyst of the invention is very suitable for converting various hydrocarbon containing product into more valuable hydrocarbons, for example for converting bituminous coal, bituminous sand, etc. into more valuable products, such as into fuel products suitable to be used as a diesel fuel.

The invention claimed is:

1. A process for the transformation of carbon containing compounds having a weight average carbon content of less than 30%, with a conversion yield of at least 80% by weight, into a mix of hydrocarbon compounds with 3 to 23 carbon atoms, said mix being liquid at 20° C. and at $10^5$ Pa,
    in which the said carbon containing compounds are reacted at least partly at a temperature comprised between 100° C. and 750° C., in presence of at least one reactive material and in presence of an alumino-silicate catalytic system comprising at least one counter ion selected from the group Na, K, Ca and mixtures thereof in a sufficient amount so that a (water/alumino-silicate catalytic system) mixture prepared by mixing 0.2 g of catalyst in powder form with 20 ml water having a pH of 5.56 and a temperature of 20° C., has a pH measured at 20° C. comprised between 4 and 6,
    whereby the alumino-silicate catalytic system has:
    a BET surface comprised between 5 and 60 $m^2/g$, and
    a surface formed by mesopores with a size comprised between 2 nm and 50 nm, comprised between 5 and 50 $m^2/g$,
    said alumino-silicate catalytic system further comprising 0.005% to 1% by weight of at least one element selected from the group consisting of Ba, Sr and mixtures thereof with respect to the dry weight of the alumino-silicate catalytic system.

2. The process of claim 1, in which the carbon containing compounds are reacted at least partly at a temperature comprised between 100° C. and 750° C., in presence of at least one reactive material in presence of said alumino-silicate catalytic system comprising at least one counter ion selected from the group Na, K, Ca and mixtures thereof in a sufficient amount so that a (water/alumino-silicate catalytic system) mixture prepared by mixing 0.2 g of catalyst in powder form with 20 ml water having a pH of 5.56 and a temperature of 20° C., has a pH measured at 20° C. comprised between 4.2 and 6.

3. The process of claim 1, in which said alumino-silicate catalytic system has a surface formed by mesopores with a size comprised between 20 nm and 40 nm, comprised between 10 and 40 $m^2/g$.

4. The process of claim 1, in which said alumino-silicate catalytic system has a surface formed by mesopores with a size comprised between 20 nm and 40 nm, comprised between 25 and 35 $m^2/g$, and in which said alumino-silicate catalytic system has a Si/Al atomic ratio comprised between 4 and 10.

5. The process of claim 1, in which said alumino-silicate catalytic system has a Si/Al atomic ratio comprised between 4.8 and 6.

6. The process of claim 1, in which at least 35% of the BET surface of the alumino-silicate catalytic system is formed by the surface formed by mesopores with a size comprised between 2 nm and 50 nm.

7. The process of claim 1, in which the alumino-silicate catalytic system has an open inner volume formed by mesopores with a diameter comprised between 2 nm and 50 nm, whereby at least 50% of the open inner volume formed by mesopores with a diameter comprised between 2 nm and 50 nm is formed by mesopores with a diameter comprised between 20 nm and 40 nm.

8. The process of claim 1, in which the carbon containing compounds are reacted at least partly at a temperature comprised between 100° C. and 750° C., in presence of at least one reactive material and in presence of said alumino-silicate catalytic system comprising at least one counter ion selected from the group Na, K, Ca and mixtures thereof in a sufficient amount so that a (water/alumino-silicate catalytic system) mixture prepared by mixing 0.2 g of catalyst in powder form with 20 ml water having a pH of 5.56 and a temperature of 20° C., has a pH measured at 20° C. comprised between 4.5 and 5.5.

9. The process of claim 1, in which the carbon containing compounds are reacted at least partly at a temperature comprised between 100° C. and 750° C., in presence of at least one reactive material and in presence of an alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4.6 and 5.2, and in which said alumino-silicate catalytic system has an alpha acidity of less than 0.5.

10. The process of claim 1, in which said alumino-silicate catalytic system has an alpha acidity comprised between 0.001 and 0.2.

11. The process of claim 1, in which said alumino-silicate catalytic system comprises from 2 to 10% by weight of at least one counter ion selected from the group Na, K, Ca and mixtures thereof with respect to the dry weight of the alumino-silicate catalytic system.

12. The process of claim 1, in which said alumino-silicate catalytic system comprises from 3 to 8% by weight of at least one counter ion selected from the group Na, K, Ca and mixtures thereof with respect to the dry weight of the alumino-silicate catalytic system, and in which said alumino-silicate catalytic system comprises at least Ca and K as counter ions, whereby the weight ratio Ca/K expressed in their oxide form $CaO/K_2O$ is comprised between 0.5 and 3.

13. The process of claim 1, in which said alumino-silicate catalytic system comprises at least Ca and K as counter ions, whereby the weight ratio Ca/K expressed in their oxide form $CaO/K_2O$ is comprised between 1.2 and 1.8.

14. The process of claim 1 in which said alumino-silicate catalytic system comprises at least 250 ppm of atoms selected from the group consisting of Ba, Sr and mixtures thereof.

15. The process of claim 1, in which said alumino-silicate catalytic system comprises from 500 ppm to 5000 ppm of atoms selected from the group consisting of Ba, Sr and mixtures thereof.

16. The process of claim 1, in which said alumino-silicate catalytic system further comprises from 10 ppm up to 1000 ppm of element selected from the group consisting of Mn, Cr, Fe, Zn, Ti and mixtures thereof.

17. The process of claim 1, in which said alumino-silicate catalytic system has a form selected from the group consisting of elementary alumino-silicate catalytic particles, agglomerated product comprising elementary alumino-silicate catalytic particles, support provided with a coating comprising elementary alumino-silicate catalytic particles, and combinations thereof, whereby the elementary alumino-silicate catalytic particles have an average particle size of less than 1 mm.

18. The process of claim 1, in which said alumino-silicate catalytic system has a form selected from the group consisting of elementary alumino-silicate catalytic particles, agglomerated product comprising elementary alumino-silicate catalytic particles, support provided with a coating comprising elementary alumino-silicate catalytic particles, and combinations thereof, whereby the elementary alumino-silicate catalytic particles have an average particle size comprised between 10 μm and 100 μm.

19. The process of claim 1, in which the reactive material is a solid carbon containing material having a carbon content higher than 65% by weight and a hydrogen content directly bound to a carbon atom of less than 5% by weight.

20. The process of claim 1, in which the reactive material is a solid carbon containing material having a carbon content higher than 80% by weight.

21. The process of claim 1, in which the reactive material is a solid carbon containing material having a carbon content higher than 65% by weight, and in which the weight ratio solid carbon containing material having a carbon content higher than 65% by weight/alumino silicate catalytic system is comprised between 0.5 and 100.

22. The process of claim 1, in which the carbon containing compounds are reacted in presence of a catalytic mixture comprising:
(a) an alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 m$^2$/g, and
a surface formed by mesopores with a size comprised between 2 nm and 50 nm, comprised between 5 and 50 m$^2$/g,
said alumino-silicate catalytic system further comprising 0.005% to 1% by weight of at least one element selected from the group consisting of Ba, Sr and mixtures thereof with respect to the dry weight of the catalytic system, and
(b) a zeolite different from the alumino-silicate catalytic system (a),
whereby the weight ratio alumino-silicate catalytic system (a)/zeolite (b) is comprised between 1:20 and 20:1.

23. The process of claim 1, in which the carbon containing compounds are reacted in presence of a catalytic mixture comprising:
(a) an alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 m$^2$/g, and
a surface formed by mesopores with a size comprised between 2 nm and 50 nm, comprised between 5 and 50 m$^2$/g,
said alumino-silicate catalytic system further comprising 0.005% to 1% by weight of at least one element selected from the group consisting of Ba, Sr and mixtures thereof with respect to the dry weight of the catalytic system, and
(b) an acid zeolite different from the alumino-silicate catalytic system (a),
whereby the weight ratio alumino-silicate catalytic system (a)/acid zeolite (b) is comprised between 1:10 and 10:1.

24. The process of claim 1, in which the carbon containing compounds are reacted in presence of a catalytic mixture comprising:
(a) a first alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 m$^2$/g,
a surface formed by mesopores with a size comprised between 2 nm and 50 nm, comprised between 5 and 50 m$^2$/g, and
an alpha acidity comprised between 0.3 and 1,
said first alumino-silicate catalytic system further comprising 0.005% to 1% by weight of at least one element selected from the group consisting of Ba, Sr and mixtures thereof with respect to the dry weight of the catalytic system, and
(b) a second alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 m$^2$/g,
a surface formed by mesopores with a size comprised between 2 nm and 50 nm, comprised between 5 and 50 m$^2$/g, and
an alpha acidity of less than 0.3,
said second alumino-silicate catalytic system further comprising 0.005% to 1% by weight of at least one element selected from the group consisting of Ba, Sr and mixtures thereof with respect to the dry weight of the catalytic system,
whereby the weight ratio first alumino-silicate catalytic system (a)/second alumino-silicate catalytic system (b) zeolite (b) is comprised between 1:50 and 20:1.

25. A process for the at least partial transformation of carbon containing compounds selected from the group consisting of polymer waste, plastic waste, and mixtures thereof, in presence of a solid carbon containing material having a carbon content higher than 80%, into a liquid fuel, in which the said carbon containing compounds is reacted at least partly at a temperature comprised between 100° C. and 750° C., in presence of said solid carbon containing material having a carbon content higher than 80% and in presence of an alumino-silicate catalytic system comprising at least one counter ion selected from the group Na, K, Ca and mixtures thereof in a sufficient amount so that a (water/alumino-silicate catalytic system) mixture prepared by mixing 0.2 g of catalyst in powder form with 20 ml water having a pH of 5.56 and a temperature of 20° C., has a pH measured at 20° C. comprised between 4 and 6, whereby the alumino-silicate catalytic system has:

a BET surface comprised between 5 and 60 m$^2$/g, and a surface formed by mesopores with a size comprised between 2 nm and 50 nm, comprised between 5 and 50 m$^2$/g, said alumino-silicate catalytic system further comprising 0.005% to 1% by weight of at least one element selected from the group consisting of Ba, Sr and mixtures thereof with respect to the dry weight of the alumino-silicate catalytic system.

26. The process of claim 25, in which the carbon containing compounds are reacted at least partly at a temperature comprised between 100° C. and 750° C., in presence of said solid carbon containing material having a carbon content higher than 80% and in presence of said alumino-silicate catalytic system comprising at least one counter ion selected from the group Na, K, Ca and mixtures thereof in a sufficient amount so that a (water/alumino-silicate catalytic system) mixture prepared by mixing 0.2 g of catalyst in powder form with 20 ml water having a pH of 5.56 and a temperature of 20° C., has a pH measured at 20° C. comprised between 4.2 and 6.

27. The process of claim 25, in which said alumino-silicate catalytic system has a surface formed by mesopores with a size comprised between 20 nm and 40 nm, comprised between 10 and 40 m$^2$/g.

28. The process of claim 25, in which said alumino-silicate catalytic system has a surface formed by mesopores with a size comprised between 20 nm and 40 nm, comprised between 25 and 35 m$^2$/g, and in which said alumino-silicate catalytic system has a Si/Al atomic ratio comprised between 4 and 10.

29. The process of claim 25, in which said alumino-silicate catalytic system has a Si/Al atomic ratio comprised between 4.8 and 6.

30. The process of claim 25, in which at least 35% of the BET surface of the alumino-silicate catalytic system is formed by the surface formed by mesopores with a size comprised between 2 nm and 50 nm.

31. The process of claim 25, in which the alumino-silicate catalytic system has an open inner volume formed by mesopores with a diameter comprised between 2 nm and 50 nm, whereby at least 50% of the open inner volume formed by mesopores with a diameter comprised between 2 nm and 50 nm is formed by mesopores with a diameter comprised between 20 nm and 40 nm.

32. The process of claim 25, in which the carbon containing compounds are reacted at least partly at a temperature comprised between 100° C. and 750° C., in presence of said solid carbon containing material having a carbon content higher than 80% and in presence of said alumino-silicate catalytic system comprising at least one counter ion selected from the group Na, K, Ca and mixtures thereof in a sufficient amount so that a (water/alumino-silicate catalytic system) mixture prepared by mixing 0.2 g of catalyst in powder form with 20 ml water having a pH of 5.56 and a temperature of 20° C., has a pH measured at 20° C. comprised between 4.5 and 5.5.

33. The process of claim 25, in which the carbon containing compounds are reacted at least partly at a temperature comprised between 100° C. and 750° C., in presence of said solid carbon containing material having a carbon content higher than 80% and in presence of an alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4.6 and 5.2, and in which said alumino-silicate catalytic system has an alpha acidity of less than 0.5.

34. The process of claim 25, in which said alumino-silicate catalytic system has an alpha acidity comprised between 0.001 and 0.2.

35. The process of claim 25, in which said alumino-silicate catalytic system comprises from 2 to 10% by weight of at least one counter ion selected from the group Na, K, Ca and mixtures thereof with respect to the dry weight of the alumino-silicate catalytic system.

36. The process of claim 25, in which said alumino-silicate catalytic system comprises from 3 to 8% by weight of at least one counter ion selected from the group Na, K, Ca and mixtures thereof with respect to the dry weight of the alumino-silicate catalytic system, and in which said alumino-silicate catalytic system comprises at least Ca and K as counter ions, whereby the weight ratio Ca/K expressed in their oxide form CaO/K$_2$O is comprised between 0.5 and 3.

37. The process of claim 25, in which said alumino-silicate catalytic system comprises at least Ca and K as counter ions, whereby the weight ratio Ca/K expressed in their oxide form CaO/K$_2$O is comprised between 1.2 and 1.8.

38. The process of claim 25, in which said alumino-silicate catalytic system comprises at least 250 ppm of atoms selected from the group consisting of Ba, Sr and mixtures thereof.

39. The process of claim 25, in which said alumino-silicate catalytic system comprises from 500 ppm to 5000 ppm of atoms selected from the group consisting of Ba, Sr and mixtures thereof.

40. The process of claim 25, in which said alumino-silicate catalytic system further comprises from 10 ppm up to 1000 ppm of element selected from the group consisting of Mn, Cr, Fe, Zn, Ti and mixtures thereof.

41. The process of claim 25, in which said alumino-silicate catalytic system has a form selected from the group consisting of elementary alumino-silicate catalytic particles, agglomerated product comprising elementary alumino-silicate catalytic particles, support provided with a coating comprising elementary alumino-silicate catalytic particles, and combinations thereof, whereby the elementary alumino-silicate catalytic particles have an average particle size of less than 1 mm.

42. The process of claim 25, in which said alumino-silicate catalytic system has a form selected from the group consisting of elementary alumino-silicate catalytic particles, agglomerated product comprising elementary alumino-silicate catalytic particles, support provided with a coating comprising elementary alumino-silicate catalytic particles, and combinations thereof, whereby the elementary alumino-silicate catalytic particles have an average particle size comprised between 10 μm and 100 μm.

43. The process of claim 25, in which the carbon containing compounds are reacted in presence of a catalytic mixture comprising:

(a) an alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 m$^2$/g, and
a surface formed by mesopores with a size comprised between 2 nm and 50 nm, comprised between 5 and 50 m$^2$/g,
said alumino-silicate catalytic system further comprising 0.005% to 1% by weight of at least one element selected from the group consisting of Ba, Sr and mixtures thereof with respect to the dry weight of the catalytic system, and
(b) a zeolite different from the alumino-silicate catalytic system (a),
whereby the weight ratio alumino-silicate catalytic system (a) /zeolite (b) is comprised between 1:20 and 20:1.

44. The process of claim 25, in which the carbon containing compounds are reacted in presence of a catalytic mixture comprising:
(a) an alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 m$^2$/g, and
a surface formed by mesopores with a size comprised between 2 nm and 50 nm, comprised between 5 and 50 m$^2$/g,
said alumino-silicate catalytic system further comprising 0.005% to 1% by weight of at least one element selected from the group consisting of Ba, Sr and mixtures thereof with respect to the dry weight of the catalytic system, and
(b) an acid zeolite different from the alumino-silicate catalytic system (a),
whereby the weight ratio alumino-silicate catalytic system (a)/acid zeolite (b) is comprised between 1:10 and 10:1.

45. The process of claim 25, in which the carbon containing compounds are reacted in presence of a catalytic mixture comprising:
(a) a first alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 m$^2$/g,
a surface formed by mesopores with a size comprised between 2 nm and 50 nm, comprised between 5 and 50 m$^2$/g, and
an alpha acidity comprised between 0.3 and 1,
said first alumino-silicate catalytic system further comprising 0.005% to 1% by weight of at least one element selected from the group consisting of Ba, Sr and mixtures thereof with respect to the dry weight of the catalytic system, and
(b) a second alumino-silicate catalytic system comprising at least one counter ion selected from the group Na, K, Ca and mixtures thereof in a sufficient amount so that a water/catalyst mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 m$^2$/g,
a surface formed by mesopores with a size comprised between 2 nm and 50 nm, comprised between 5 and 50 m$^2$/g, and
an alpha acidity of less than 0.3,
said second alumino-silicate catalytic system further comprising 0.005% to 1% by weight of at least one element selected from the group consisting of Ba, Sr and mixtures thereof with respect to the dry weight of the catalytic system,
whereby the weight ratio first alumino-silicate catalytic system (a)/ second alumino-silicate catalytic system (b) zeolite (b) is comprised between 1:50 and 20:1.

46. A process for the at least partial transformation of carbon containing compounds selected from the group consisting of polymer waste, plastic waste, and mixtures thereof, in presence of a solid carbon containing material having a carbon content higher than 80%, into a liquid fuel,
in which the weight ratio carbon containing compounds selected from the group consisting of polymer waste, plastic waste, and mixtures thereof/solid carbon containing material having a carbon content higher than 80% is comprised between 2:10 and 10:2, and
in which the said carbon containing compounds is reacted at least partly at a temperature comprised between 100° C. and 750° C., in presence of said solid carbon containing material having a carbon content higher than 80% and in presence of an alumino-silicate catalytic system comprising at least one counter ion selected from the group Na, K, Ca and mixtures thereof in a sufficient amount so that a (water/alumino-silicate catalytic system) mixture prepared by mixing 0.2 g of catalyst in powder form with 20 ml water having a pH of 5.56 and a temperature of 20° C., has a pH measured at 20° C. comprised between 4 and 6,
whereby the alumino-silicate catalytic system has:
a BET surface comprised between 5 and 60 m$^2$/g, and
a surface formed by mesopores with a size comprised between 2 nm and 50 nm, comprised between 5 and 50 m$^2$/g,
said alumino-silicate catalytic system further comprising 0.005% to 1% by weight of at least one element selected from the group consisting of Ba, Sr and mixtures thereof with respect to the dry weight of the alumino-silicate catalytic system.

47. The process for the at least partial transformation of carbon containing compounds selected from the group consisting of polymer waste, plastic waste, and mixtures thereof, in presence of a solid carbon containing material having a carbon content higher than 80%, into a liquid fuel,
in which the weight ratio carbon containing compounds selected from the group consisting of polymer waste, plastic waste, and mixtures thereof/solid carbon containing material having a carbon content higher than 80% is comprised between 10:1.1 and 10:4, and in which the carbon containing compounds selected from the group consisting of polymer waste, plastic waste, and mixtures thereof is treated at a temperature comprised between 200 and 600° C. and under a pressure comprised between $0.1\ 10^5$ Pa and $50\ 10^5$ Pa in presence of said solid carbon containing material having a carbon content higher than 80% and in presence of an alumino-silicate catalytic system comprising at least one counter ion selected from the group Na, K, Ca and mixtures thereof in a sufficient amount so that a (water/alumino-silicate catalytic system) mixture prepared by mixing 0.2 g of catalyst in powder form with 20 ml water having a pH of 5.56 and a temperature of 20° C., has a pH measured at 20° C. comprised between 4 and 6, whereby the alumino-silicate catalytic system has:

a BET surface comprised between 5 and 60 $m^2/g$, and a surface formed by mesopores with a size comprised between 2 nm and 50 nm, comprised between 5 and 50 $m^2/g$, said alumino-silicate catalytic system further comprising 0.005% to 1% by weight of at least one element selected from the group consisting of Ba, Sr and mixtures thereof with respect to the dry weight of the alumino-silicate catalytic system.

48. The process for the at least partial transformation of carbon containing compounds selected from the group consisting of polymer waste, plastic waste, and mixtures thereof, in presence of a solid carbon containing material having a carbon content higher than 80%, into a liquid fuel, in which the carbon containing compounds selected from the group consisting of polymer waste, plastic waste, and mixtures thereof is at least partly submitted to a cracking, and in which the carbon containing compounds selected from the group consisting of polymer waste, plastic waste, and mixtures thereof is treated at a temperature comprised between 200 and 600° C. and under a pressure comprised between $0.1\ 10^5$ Pa and $50\ 10^5$ Pa in presence of said solid carbon containing material having a carbon content higher than 80% and in presence of an alumino-silicate catalytic system comprising at least one counter ion selected from the group Na, K, Ca and mixtures thereof in a sufficient amount so that a (water/alumino-silicate catalytic system) mixture prepared by mixing 0.2 g of catalyst in powder form with 20 ml water having a pH of 5.56 and a temperature of 20° C., has a pH measured at 20° C. comprised between 4 and 6, whereby the alumino-silicate catalytic system has:

a BET surface comprised between 5 and 60 $m^2/g$, and a surface formed by mesopores with a size comprised between 2 nm and 50 nm, comprised between 5 and 50 $m^2/g$, said alumino-silicate catalytic system further comprising 0.005% to 1% by weight of at least one element selected from the group consisting of Ba, Sr and mixtures thereof with respect to the dry weight of the alumino-silicate catalytic system.

\* \* \* \* \*